UNITED STATES PATENT OFFICE.

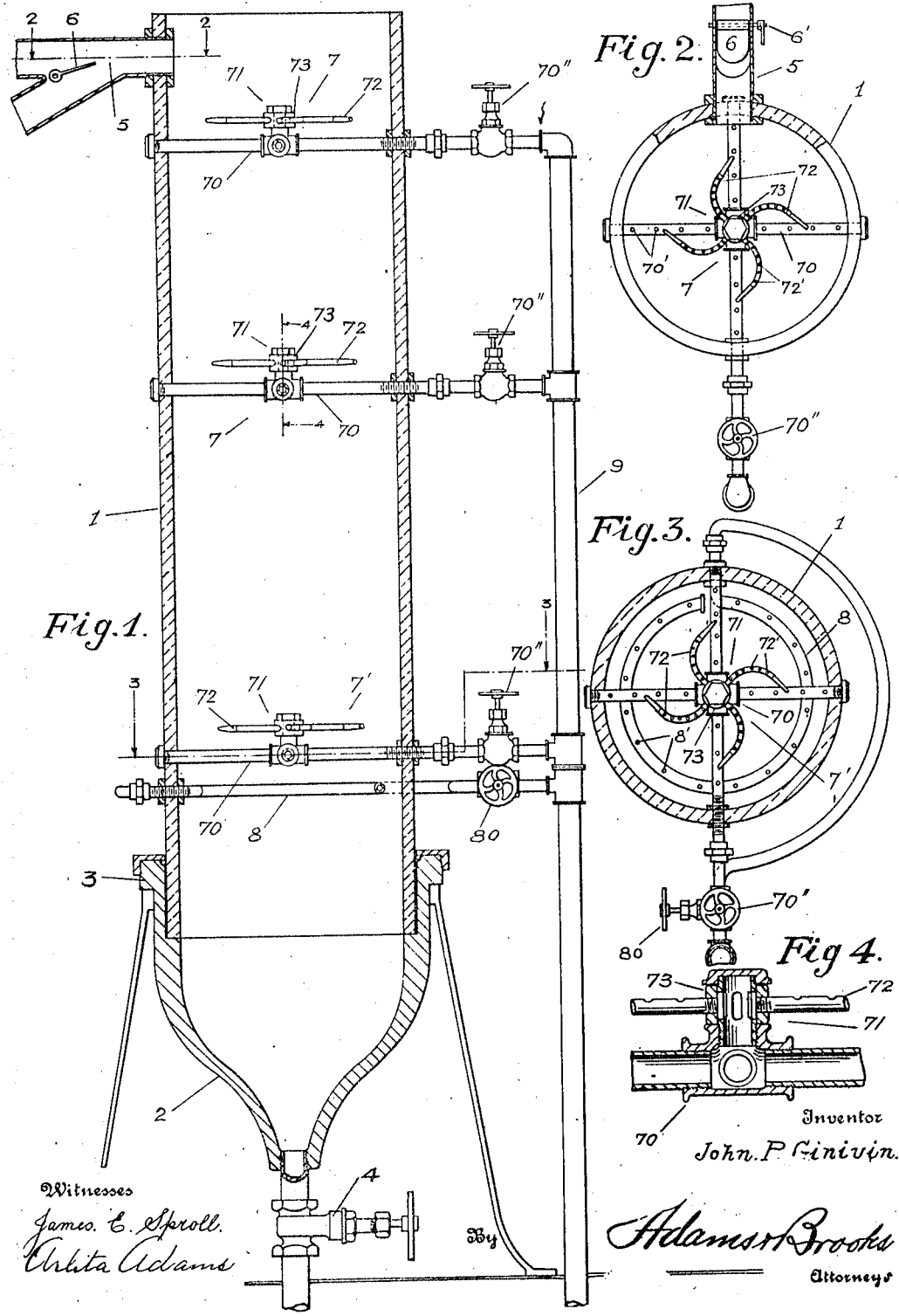

JOHN P. GINIVIN, OF SEATTLE, WASHINGTON, ASSIGNOR OF ONE-THIRD TO JOHN SMITH AND ONE-THIRD TO JEAN S. T. JACKSON, BOTH OF SEATTLE, WASHINGTON.

ORE-CLASSIFIER.

980,244.

Specification of Letters Patent.   Patented Jan. 3, 1911.

Application filed January 31, 1910.  Serial No. 541,200.

*To all whom it may concern:*

Be it known that I, JOHN P. GINIVIN, a citizen of the United States of America, and a resident of the city of Seattle, in the county of King and State of Washington, have invented certain new and useful Improvements in Ore-Classifiers, of which the following is a specification.

The present invention pertains to apparatus for disseminating metalliferous slimes or comminuted ore and has particular reference to an improved fluid delivery system whereby current effects of greater value can be produced.

The invention resides in certain novel features in the constructions, combinations and arrangements of parts as set forth in the following description and defined in the appended claims.

In the accompanying drawing wherein similar reference numerals designate corresponding parts throughout: Figure 1 is a vertical section of a classifier embodying the features of my invention in such form as now preferred by me. Fig. 2 is a plan in partial section on line 2—2 of Fig. 1. Fig. 3 is a horizontal section on line 3—3 of Fig. 1, and Fig. 4 is a vertical section on line 4—4 of Fig. 1.

The invention embraces a separating chamber comprising a transparent wall section, as a glass tube 1, and a tapering base section as 2, which as shown is connected with a gate valve 4 and provided with a stuffing box 3 wherein tube 1 is seated.

Connected with the upper portion of tube 1 is a Y-shaped outlet 5 equipped in its branching portion with a deflector or plate 6 which is secured to a stem 6' seated in the wall of the outlet for adjustment of the deflector to various angular positions as may be desired in grading the materials carried in to the outlet.

In conjunction with the separating chamber I provide fluid delivery heads as 7, 7, 7' and 8 which as shown are arranged in respective portions of tube 1 and connected with a pipe 9 leading from a supply of water under pressure. The heads 7 and 7' are identical in form, each comprising a cross 70 of piping extending transversely of tube 1, and a rotatable jet 71 provided with curved nozzles 72 carried by a hub 73 rotatably mounted on a suitable journal having communication with the cross and nozzles. The arms of each cross are seated in suitable apertures in the wall of tube 1 and one arm of each cross is connected with pipe 9 through a respective shutoff valve 70'' while the other arms are provided with suitable caps. The nozzles 72 are directed for outward delivery and provided with upwardly directed discharge orifices 72' while the arms of the crosses 70 are provided with similar orifices as 70'. Head 8 as will be observed extends beneath head 7' in proximity to the wall of tube 1 and appears in the form of a pipe which is connected through a shutoff valve 80 with pipe 9 and provided with discharge orifices 8' directed for discharge between the path of the adjacent jet 71 and the wall of the chamber.

In operation the jets 71, driven by the water discharging from the ends of their nozzles, produce swirls or eddies which receive the delivery from the adjacent crosses 70, while the delivery from head 8 tends to maintain an upward flow which receives the delivery from the outer ends of the nozzles. The materials to be treated being fed to the upper end of the chamber are therefore subjected to disseminating effects tending to force them outwardly and upwardly and resulting in thorough cleansing of the heavier particles as they gravitate to base 2 while the lighter particles are caught by the currents and carried to outlet 5.

The effect of the currents upon the materials may be noted by inspection through the wall of the tube and the valves 70'' and 80 adjusted to regulate the strength of the currents as found desirable.

Deflector 6 is adjusted in accordance with the volume of flow in the outlet to direct the suspended materials to the lower branch while permitting of the remainder of the float being carried along in the upper branch, and valve 4 is opened from time to time to withdraw the materials accumulating in the base of the chamber.

Having thus described my invention what I claim as new, and desire to secure by Letters Patent of the United States of America, is—

1. An ore classifier comprising a separating chamber adapted to contain water, rotatably supported means arranged to be normally submerged in said chamber, said means comprising a hub provided with a plurality of outwardly projecting nozzles formed intermediate their ends with spaced upwardly directed discharge orifices, and fluid delivery means for directing water for discharge in an upward direction arranged below said first means for producing an upward flow for receiving discharge from the nozzles thereof.

2. An ore classifier comprising a separating chamber adapted to contain water, a rotatable fluid delivery head provided with outwardly curved nozzles formed intermediate their ends with spaced upwardly directed discharge orifices, a hollow support for said delivery head extending across said chamber and communicating with said fluid delivery head, said support being formed with spaced discharge orifices, and means below said support for producing an upward flow adjacent the wall of said chamber.

3. An ore classifier comprising a separating chamber adapted to contain water, a rotatable fluid delivery head arranged to be normally submerged and provided with outwardly curved nozzles arranged to direct dicharge of water in an outward direction and formed intermediate their ends with spaced upwardly directed discharge orifices, means arranged beneath said head to discharge water upwardly into the swirl produced upon rotation of said head, and means below said last means for producing an upward flow adjacent the wall of said chamber.

4. An ore classifier comprising a separating chamber adapted to contain water, a plurality of rotatable fluid delivery heads spaced one above another, means below each of said heads for directing water for discharge into the swirl produced thereby, and means below all of said delivery heads for producing an upward flow adjacent the wall of said chamber.

Signed at Seattle, Washington this 4" day of January 1910.

JOHN P. GINIVIN.

Witnesses:
ARLITA ADAMS,
A. A. BOOTH.